United States Patent [19]
Maugendre et al.

[11] Patent Number: 6,125,658
[45] Date of Patent: Oct. 3, 2000

[54] GLASS FURNACE AND INSTALLATION COMPRISING SAME

[75] Inventors: Stephane Maugendre, Precy sur Oise; Tanguy Massart, Courbevoie; Francois Szalata, Rautigny, all of France

[73] Assignee: Isover Saint-Gobain, Courbevoie, France

[21] Appl. No.: 09/147,854

[22] PCT Filed: Jul. 21, 1998

[86] PCT No.: PCT/FR98/01597

§ 371 Date: Jun. 7, 1999

§ 102(e) Date: Jun. 7, 1999

[87] PCT Pub. No.: WO99/05068

PCT Pub. Date: Feb. 4, 1999

[30] Foreign Application Priority Data

Jul. 22, 1997 [FR] France ................................ 97/09302
May 19, 1998 [FR] France ................................ 98/06323

[51] Int. Cl.[7] .................................................. C03B 5/02
[52] U.S. Cl. ..................... 65/135.6; 65/135.7; 65/135.9; 65/136.2; 65/141; 65/516; 65/521; 65/469; 65/470; 65/355; 65/356; 65/325; 65/326; 373/29; 373/30; 373/33; 373/36; 373/41; 373/117; 373/109; 373/134; 219/420; 219/422
[58] Field of Search ........................... 65/355, 356, 325, 65/326, 135.6, 135.7, 135.9, 136.2, 141, 516, 521, 469, 470; 373/29, 30, 33, 36, 41, 117, 134, 109; 219/420, 422

[56] References Cited

U.S. PATENT DOCUMENTS 2,089,690   8/1937   Cornelius .
2,215,982   9/1940   Slayter et al. .
2,591,708   4/1952   Lubatti .
2,817,695   12/1957  Hartwig .
4,375,449   3/1983   Siddall .
4,468,164   8/1984   Dunn et al. .
4,862,477   8/1989   Olds et al. .
5,338,329   8/1994   Aube et al. .

OTHER PUBLICATIONS

Tipler, Paul, Physics for Scientists and Engineers, 3rd Ed., vol. 1, p. 338, 1991.

Pincus, Alexis, et al., Electric Melting in the Glass Industry, pp. 37, 58, 1976.

Primary Examiner—Stanley S. Silverman
Assistant Examiner—Michael P. Colaianni
Attorney, Agent, or Firm—Oblon, Spivak, McClelland, Maier & Neustadt, P.C.

[57] ABSTRACT

The invention relates to the electric melting technique, in which the melting energy is dissipated in the bath of melted glass as a result of the Joule effect by means of electrodes which dip through the surface of the bath. According to the invention, the electrodes dip into a bath of melted glass which has a height h below 800 mm and a surface S such that the ratio h/S is lower than 0.5 m/m². According to another aspect, the exchange surface between the electrodes and the bath is above 0.075 m²/m³ of glass.

The invention is used in the manufacture of glass-based products, such as insulating materials based on glass fiber.

25 Claims, 4 Drawing Sheets

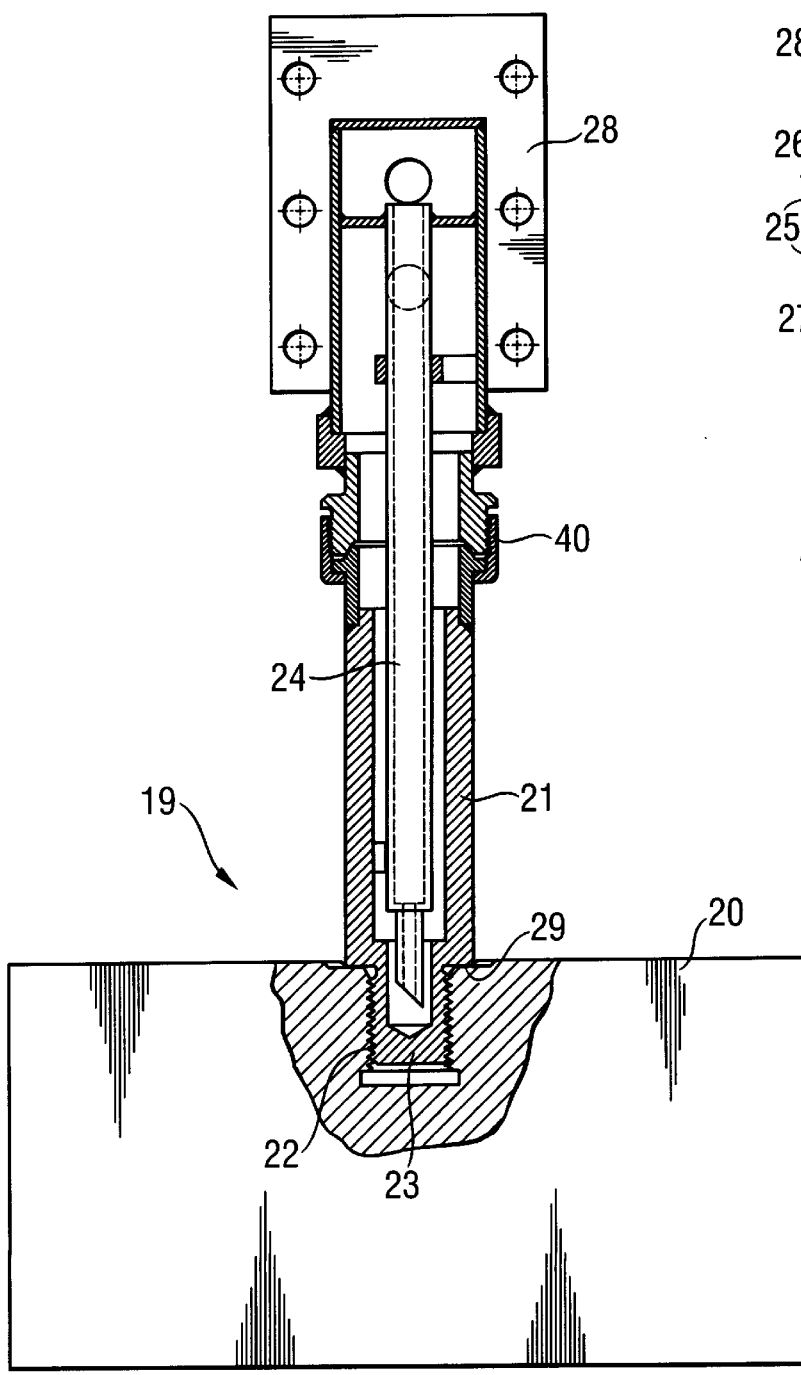
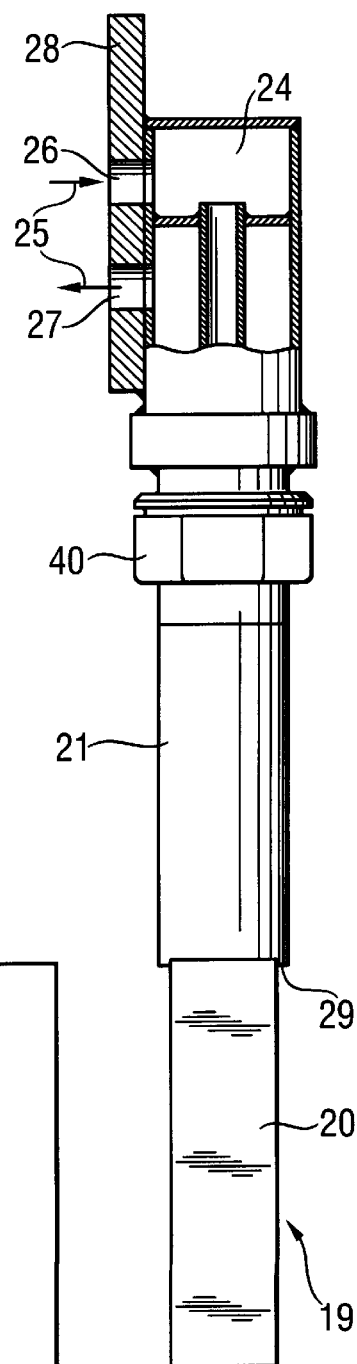

GLASS FURNACE AND INSTALLATION COMPRISING SAME

BACKGROUND OF THE INVENTION

1. Field of the Invention

The present invention relates to the techniques of the electric melting of glass, in which the conductivity of the melted glass is utilized in order to generate, as a result of the Joule effect, the energy necessary for melting the raw materials.

2. Discussion of the Background

In a first type of electric glass-melting furnace, energy is supplied by means of electrodes completely submerged in the mass of melted glass (referred to below as the bath) and arranged vertically on the hearth of the furnace and/or horizontally on the side walls of the furnace, the composition to be melted being introduced from above, so as to maintain a surface layer forming both a permanent reserve of raw materials and protection for the bath against surface heat losses.

Convective movements take place in the bath of melted glass, these being attributable to the changes in density of the glass according to its degree of heating and contributing to transporting the heat towards the surface layer, where fusion is to take place, and in the remaining volume of the bath. These movements are particularly intense along the electrode on account of the temperature gradient existing in relation to the adjacent mass of glass.

In this configuration where the electrodes are completely submerged, the energy exchange surface between the electrode and the bath is distributed over virtually the entire height of the bath. Consequently, the temperature difference of the glass according to the height of the bath is not very pronounced and the convective movements are of very high amplitude, the stream of hot glass rising along the electrode and then running along the layer of materials to be melted, in order to supply the fusion energy to this layer. This circulation results in continual agitation of the bath which makes it possible to homogenize the mass of melted glass in terms of both composition and temperature.

In general terms, furnaces of this type comprise a shaft made of refractory material, which is very deep, usually of the order of at least 1.5 m, and in which a thickness of melted glass of the order of at least 1.2 to 1.4 m is provided, so that the materials which melt below the surface layer have a sufficient dwell time in the bath to reach a homogeneous state of composition and temperature and thereby produce a satisfactory glass.

The complete submergence of the electrodes, which is considered an advantage since it allows a relatively uniform supply of energy throughout the volume of the bath, imposes constraints, however, since the violent agitation movements mentioned above cause the erosion of the hearth, and measures must be taken in order to protect the hearth against this wear which may also affect the electrodes themselves.

More recently, the electric melting technique underwent a major change which involved dipping the electrodes into the bath through the free surface of the latter, instead of causing them to spring up into the bath from the hearth. This made it possible to solve the difficult problems of replacing the worn electrodes and of leaktightness which were associated with the passage of the electrodes through the refractory of the hearth. It was also possible to reduce the wear of the refractories, since the use of dipping electrodes eliminates direct heating in the region of the hearth, the hot zones being localized in an upper part of the melted bath, and it is therefore possible to limit the generation of convection currents in contact with the hearth. This configuration also allowed an increase in the possibilities for adjusting the production parameters. For more details on this technique and its advantages, reference may be made, in particular, to the document FR-A-2,599,734.

The dimensioning of the furnaces was not appreciably changed by the use of dipping electrodes, and a minimum depth has hitherto been recommended for suitably generating the temperature gradient necessary for establishing the desired relatively low temperature in the region of the hearth: in fact, the temperature profile in the bath is such that the temperature is higher in the vicinity of the electrode and decreases relatively slowly in the direction of the hearth. This minimum depth was also considered to be necessary for producing a glass of good quality.

SUMMARY OF THE INVENTION

The object of the invention is to improve the definition of electric melting furnaces with dipping electrodes, so as to optimize the production conditions, particularly, with production being equal, by reducing the investment and/or operating cost, along with improved profitability.

Quite surprisingly, it became clear to the present inventors that, the production capacity being equal, the volume of the melting bath and, in the equivalent way, the dwell (residence) time of the materials in the bath could be appreciably reduced, as compared with the prior art, without the qualities of the glass being appreciably affected. Thus, contrary to the preconceived idea that a minimum bath height is necessary to produce a glass which is homogeneous in terms of composition and temperature, the inventors succeeded in producing perfectly satisfactory glasses in a furnace, the depth of which was reduced to a very significant extent.

In this respect, the subject of the invention is a furnace for the preparation of glass by electric melting, in which furnace the melting energy is dissipated into the melted mass as a result of the Joule effect, the said furnace comprising means for the feed of vitrifiable materials, depositing the said materials in a layer on the surface of a bath of melted glass, and dipping melting electrodes immersed from the surface of the bath down through the layer of composition to be melted which covers the melting bath, characterized in that the height h of the melted bath is below 800 mm and the ratio of the height h to the surface S of the bath is below 0.5 m/m$^2$.

For the purposes of the present description, the height h of the melted bath denotes, in fact, the effective height of the melted bath, namely the height between the upper liquid level in the shaft and the hearth of the furnace or, where appropriate, in some cases in which the glass is drawn off at a higher level than that of the hearth, between the upper level of the liquid in the shaft and the lower level of the glass draw-off orifice. In fact, for some reasons, particularly when pollutants are liable to be deposited in the region of the hearth and contaminate the mass of glass at the bottom of the bath, it may be preferable to draw off the glass in a zone located a little above a hearth level. It is established that the mass of glass thus isolated in the lower part of the furnace does not contribute to the production of the glass and does not form part of the effective mass of the bath.

In general, it is difficult to measure accurately the exact level at which the liquid phase commences in the shaft, because the surface layer of materials covering the bath (called "crust") has equilibria between a plurality of phases (solids, liquids, gases) originating from the melting of the composition. Indirect measurement by the principle of communicating vessels is generally carried out, the upper level of liquid in a compartment downstream of the shaft being detected.

Contrary to all expectations, the present inventors found that, by carrying out electric melting in a furnace with dipping electrodes which is much less deep than usual, all things otherwise being equal, a fully worked glass is produced, which does not contain any solid particles and has satisfactory composition homogeneity, in spite of a much shorter dwell time of the materials in the melting bath than in conventional melting techniques.

The main advantage is that the reduction in the size of the furnace afforded by the invention allows a substantial saving to be made in the quantity of refractory material necessary for forming the side walls of the furnace and, consequently, in the investment cost of the installation. The reduction in the quantity of glass present in the melting bath makes it possible, on the other hand, to utilize the energy more efficiently by limiting the energy losses in the mass of glass, thus resulting in a saving in operating costs, particularly as regards the manufacture of glasses which are poor conductors of heat. Other advantages of the invention will emerge from the rest of this description.

The furnace according to the invention has a characteristic aspect ratio with a bath height limited to a value below 800 mm and small in relation to the surface of the bath. In a preferred variant, the height h of melted glass may advantageously be reduced to a value below 500 mm, particularly below or equal to in 450 mm, with a very significant reduction in the cost of the furnace. Heights below or equal to 400 mm, particularly of the order of 300 mm or less, are particularly preferred.

In a particular embodiment, moreover, the ratio h/S defined above is below or equal to 0.05, for example of the order of 0.03 or less. According to preferred variants in which the furnace has a large surface along with a high production capacity, the ratio h/S may even be below or equal to 0.02, even 0.01 or 0.005.

The height of the shaft will advantageously be limited as a result, preferably to a value superior of 100 to 200 mm, particularly of the order of 150 mm, to the height of the bath.

There ought, in theory, to be no lower limit placed on the height h of melted glass, and the average person skilled in the art ought to be free to select heights which are as small as of the order of a few centimetres, provided that a sufficient contact surface between the electrodes and the melted glass is preserved in order to supply the necessary melting energy. In fact, the inventors observed that, as soon as a distance of more than 2 to 3 cm below the upper level of liquid in the shaft (as defined above) is adopted, no solid particle remains in the bath (that is to say, melting is achieved) and the glass is fully worked. In this respect, it may be mentioned that any bath height of 20 to 300 mm is included in the invention, the corresponding furnaces being essentially melting appliances producing worked, but relatively less refined glasses than traditional furnaces.

What is notable as regards the invention, therefore, is that it makes it possible to process the same quantity of materials as a traditional furnace having the same specific draw, but in a furnace of reduced height: consequently, although the electrodes supply the same quantity of energy, they transmit it to a smaller bath volume. By thus modifying the energy supply conditions in the bath, the temperature profile in the bath is such that glass circulation currents favourable to the production of a homogeneous glass are established in the melted glass mass.

Thus, according to another aspect of the invention, the furnace is characterized by a bath height below 800 mm, especially below 500 mm, in particular below 450 mm, and by an exchange surface between the electrodes and the melted glass (this surface consisting of the lateral electrode surface immersed under the upper level of liquid present in the shaft per unit of bath volume) above 0.075 $m^2$ of electrode per $m^3$ of glass.

According to the invention, the mass of glass has a higher energy exchange surface than normal. There is consequently a larger relative quantity of glass exposed to the electrodes than in traditional furnaces.

The electrode surface per unit of bath volume is advantageously above 0.1 $m^2$ per $m^3$, preferably above or equal to 0.15 $m^2$ per $m^3$, especially of the order of 0.2 $m^2$ per $m^3$ or more.

The depth of immersion of the electrodes in the melted bath is necessarily limited to a value below the height of the bath, in order to avoid contact between the electrode and the hearth. This depth of submergence must, however, be sufficient to afford the exchange surface necessary for dissipating the desired power.

Particularly in order to limit the wear of the hearth, especially due to erosion caused by the convection currents of glass in the bath, it may be preferable for the submerged length of the electrodes to be below or equal to two thirds of the height of the bath, preferably below or equal to half the height of the bath, the depth of submergence also depending on the height of the bath. This makes it possible to localize the hottest zones in the vicinity of the surface of the bath, the fusion energy being dissipated where this is most needed. Moreover, this precaution proves favourable to a circulation of the melted materials along a path allowing the rapid working and homogenization of the glass within the relatively shallow bath.

Advantageously, the shape of the electrodes may be designed so that they have a very high lateral surface along with a minimum length. Use will therefore advantageously be made of electrodes, particularly of substantially cylindrical contour, the dimensions of which are such that their lateral surface $S_{el}$ and their immersed length l are in a ratio $S_{el}/l$ above or equal to 0.45, advantageously above or equal to 0.6.

In a particularly advantageous embodiment, at least one electrode may comprise at least one substantially plane conductor element. In particular, such an electrode may be in the form of a plate or comprise a plurality of plates combined with one another. A substantially plane conductor element may, nevertheless, also be in the form of a strip or be composed of a plurality of juxtaposed wires.

Preferably, such plates are square or rectangular, particularly for reasons of easy manufacture, although any other form of plate also makes it possible to feed electrical current to the glass bath in order to generate a Joule effect.

In fact, electrodes of the cylindrical type are less preferred according to the invention, from the moment when the depth of the glass bath becomes increasingly smaller, since, in order to obtain a sufficient lateral exchange surface along with a small immersed length, a cylinder of large diameter, hence relatively heavy, has to be used. One solution may involve using a hollow cylinder, since only the lateral surface of the electrode contributes to electrical exchange, the inner part being completely inert in this respect. However, this solution is of no use in economic terms in the current state of the technology of the materials capable of forming the electrodes (such as molybdenum), since a hollow cylinder can be manufactured only by milling, the eliminated material, which is lost, nevertheless being included in the manufacturing cost of such a hollow electrode.

The use of flat electrodes or of electrodes consisting of plates makes it possible, as compared with conventional electrodes in the form of a cylindrical bar, to reduce the weight of the electrode considerably, with the lateral surface being equal. This weight saving is a major benefit in the furnace of the invention, where the electrodes dip, that is to say are suspended on a supporting element.

The use of plates overcomes the economic handicap mentioned above with regard to hollow cylinders.

The dimensions of the plates are selected according to the desired exchange surface, the thickness being selected in order to ensure that the electrode has a sufficiently long life as a function of the kinetics of wear as a result of the consumption of the conductive material forming the electrode, under the operating conditions of the furnace.

Advantageously, when the depth of the furnace is very small, the electrode comprises at least one plate, in particular rectangular, arranged in such a way that its side having the largest dimension is oriented in a substantially horizontal direction. Thus, the supporting element is connected to the side of largest dimension of the plate or plates. The thickness of the plate may be selected in order to ensure a resistant fastening when the supporting element penetrates into the plate, particularly by screwing.

It is possible to combine conductive plates according to widely varying configurations:

two square or rectangular plates may be arranged in the form of an L;

three square or rectangular plates may be arranged in the form of a U;

four square or rectangular plates may be arranged so as to form a hollow parallelepipedic electrode.

Preferably, the plates, combined, for example, as above, are assembled together, particularly by screwing or any other means.

Electrodes having different configurations may be used in combination in the same furnace in order to afford a particular distribution of current lines. It is thus possible, for example, to install in a furnace both cylindrical electrodes and plate-shaped electrodes or else both L-shaped electrodes and U-shaped electrodes.

The electrodes consisting of a plate or plates may, furthermore, be provided with means for adjusting the orientation of the electrical exchange surfaces, especially by pivoting about at least one axis, in particular a horizontal axis and/or a vertical axis, so as to adjust the distribution of the current lines in the bath of melted glass. stated above, an essential feature of the melting technique according to the invention is the short average dwell time of the furnace-melted materials within the bath, in relation to the production rate which is, in general, expressed by the specific draw $T_{spec}$ which is the quantity of glass (in tonnes) drawn off from the furnace per day in relation to a furnace surface of 1 m². In fact, for a constant specific draw, the dwell time of the materials in the bath is proportional to the volume of the bath and the reduction in the height of the bath brings about a corresponding reduction in the dwell time.

In this respect, another subject of the invention is a method for the electric melting of glass, in which the energy is dissipated into the melted mass from dipping electrodes as a result of the Joule effect, the said method comprising the steps involving distributing the materials forming the composition to be melted in a layer on the surface of the bath, immersing the electrodes from the surface of the bath down through the said layer of composition to be melted, feeding an electric current to the electrodes, the materials melting and combining in the bath to form the glass, and drawing off the melted glass at a flow rate expressed by the specific draw $T_{spec}$, characterized in that the average dwell time (in days) of the materials in the bath between the surface layer and the draw-off zone is below $2/T_{spec}$, advantageously below $1.2/T_{spec}$ or even below $0.8/T_{spec}$.

As an indication, under preferred operating conditions, the average dwell time of the materials in the bath between the surface layer and the draw-off zone is below or equal to 0.7 days, advantageously below or equal to 0.5 days, for example of the order of 0.25 to 0.4 days, for a specific draw of the order of 3 t/m²/d.

The furnace according to the invention proves particularly advantageous for the production of glasses which are "opaque" to infrared radiation, such as, for example, glasses containing a relatively high proportion of iron oxide (for example, of the order of at least 0.60% of $Fe_2O_3$, which may attain 10–12% or more), in which radiation spreads in a limited way. Normally, in furnaces of conventional size, the low conductivity of the radiation results in pronounced temperature differences between the zones of the bath, in particular with relatively cold zones at the bottom of the bath where the glass tends to devitrify. Due to its small depth, the furnace according to the invention makes it possible to establish a thermal gradient which avoids producing these cold zones and limits the risks of devitrification of these particular glasses.

The melting technique according to the invention makes it possible, with less costly equipment and under more economical operating conditions, to produce good-quality glass which can be employed in a large number of uses, with results which are as satisfactory as those of glass worked in traditional furnaces. For example, the melted glass according to the invention may be converted into glass wool, in particular for the production of insulating products of a quality equivalent to that of existing wools.

Consequently, another subject of the invention is an installation for the manufacture of glass wool, comprising a glass melting furnace, a fibre-drawing device and means for feeding the fibre-drawing device with glass produced in the said furnace, characterized in that the furnace is a small-depth furnace with dipping electrodes, as described above.

Other conceivable uses are, in particular, the manufacture of reinforcing fibres or of glass substrates of various forms.

For uses where a glass of very high quality is required, it is possible to couple the furnace according to the invention to an additional device which carries out rehomogenization and/or refinement at the last moment before the conversion of the melted glass. Such an installation may be advantageous, as compared with an installation comprising a very deep furnace designed for producing the glass directly at the furnace outlet, the glass having the desired very high degree of homogenization and refinement: by thus placing such an additional device just upstream of the final conversion device, it is possible to compensate any possible defects (the inclusion of gas bubbles) liable to occur within the melted glass during its travel from the furnace towards the final conversion stage. The use of two separate devices, instead of a single high-performance furnace, is still, in general, economically advantageous in view of the substantial saving made on the cost of constructing the furnace.

BRIEF DESCRIPTION OF THE DRAWINGS

Further advantages and features of the invention will emerge from the following detailed description made with regard to the accompanying drawings, in which:

FIG. 4 shows a partially sectional side view of a plate-shaped electrode capable of being used in a furnace according to the invention;

FIG. 5 shows another side view of the electrode of FIG. 4;

DETAILED DESCRIPTION OF THE PREFERRED EMBODIMENTS

It will be seen that the figures are diagrammatic illustrations which do not reveal all the details of implementation within the scope of the average person skilled in the art and which are not necessarily true to scale, unless specified otherwise below.

Figure 1:
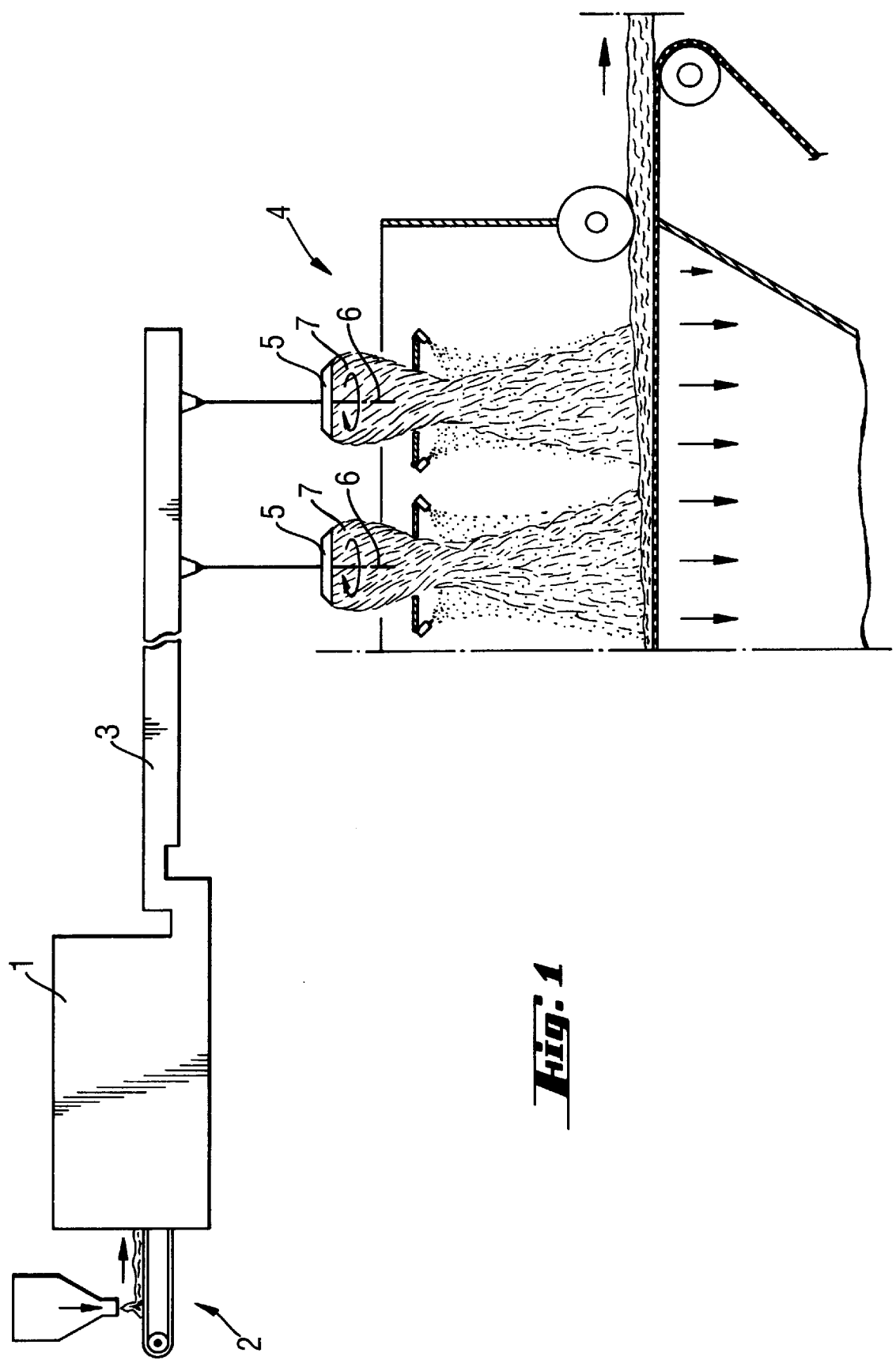
FIG. 1 shows diagrammatically an installation for the manufacture of glass wool, using an electric furnace according to the invention.

The installation shown in FIG. 1 is intended for producing glass wool for making thermal insulating materials. It comprises essentially a glass melting furnace 1 fed with a mixture of vitrifiable materials by means of a feed system 2, a channel 3 for transporting the melted glass worked in the furnace 1, and a fibre-drawing machine 4 fed with melted glass by the channel 3. In the fibre-drawing machine, the melted glass falls into a fibre-drawing spinner 5, the side wall of which is perforated with a multiplicity of orifices and which is driven in rotation about a vertical axis 6, so as to eject the melted glass centrifugally through the said orifices in the form of glass filaments 7, which solidify by cooling.

Figures 2, 3:
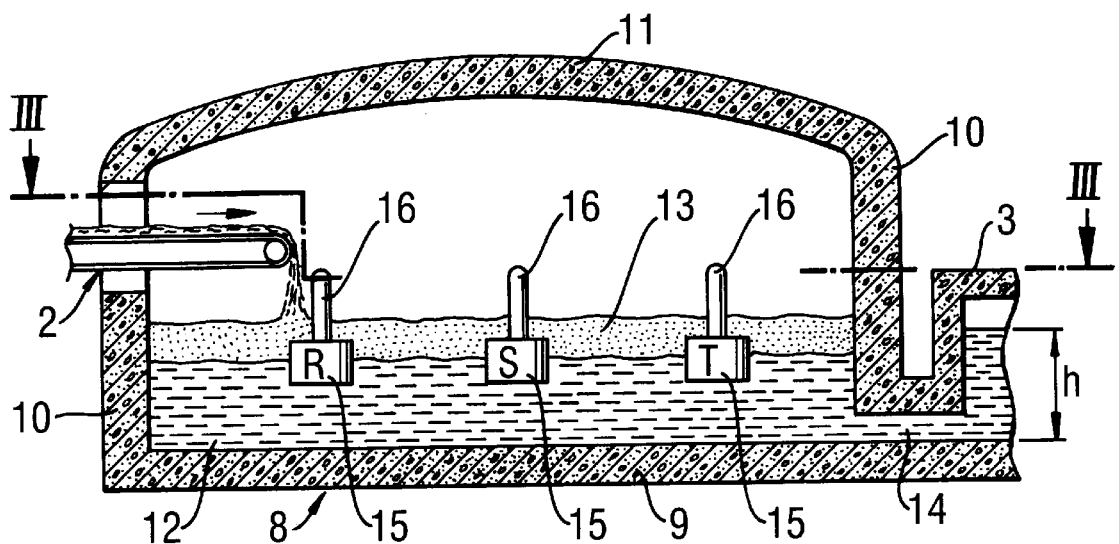
FIG. 2 shows a diagrammatic view of the furnace of FIG. 1 in longitudinal section along the axis II—II.
FIG. 3 shows a diagrammatic view of the furnace of FIG. 1 in longitudinal section along the axis III—III.

The structure of the furnace 1 emerges in detail from the two sectional views of FIGS. 2 and 3.

The furnace comprises a shaft 8 made of refractory material and consisting of a hearth 9 and vertical walls 10, the said shaft being surmounted by a vault 11. The shaft shown has a horizontal hearth 9. The shaft 8 of the furnace according to the invention may assume all the traditional general forms, but differs from traditional furnaces in the small height of the walls 10. As an example, the shaft shown has a surface of approximately 10 m² for a height of 0.4 m.

As shown in FIG. 2, the shaft 8 contains a mass of melted glass 12 forming the melting bath and covered by a layer 13 of solid raw materials distributed continuously by the feed system 2. This layer, which is as uniform as possible, may have a greater or lesser thickness, depending on the operating conditions. During operation, a thickness of at least 100 mm is preferably maintained, in order to insulate the melting bath thermally from the atmosphere. Preferably, this thickness should not exceed about 300 mm, since this does not afford any advantage for melting and would therefore needlessly overload the surface of the bath.

The height h of the bath is calculated by measuring the difference between the level of free glass in the transport channel 3 and the level of the hearth 9. In the embodiment shown, it is approximately 300 mm; the ratio h/S is therefore 0.03 (in m/m²).

In the embodiment shown, the melted material is discharged via a throat 14 located on one side of the shaft 8 and at the same level as the hearth 9, this throat communicating with the channel 3 (feeder).

Melting electrodes 15, of which there are six in this example, are arranged in the upper part of the furnace and are carried by supports 16 of the traditional type. Their arrangement, of the type described in EP-A-0,140,745, is more particularly suitable for a three-phase current feed, the distribution of the phases (R, S, T) being as indicated in FIG. 3. This arrangement allows good balancing of the phases. However, any other type of conventional feed is conceivable within the scope of the invention.

The electrodes 15 pass down through the surface layer of raw materials and penetrate into the melted bath. The smallest possible depth of immersion is preferred, provided that the necessary exchange surface is afforded. In practice a depth of immersion of below ⅔ of the height of the bath and even preferably below half this height will generally be advantageous.

In the embodiment shown, the electrodes are of cylindrical shape, short, but of relatively large diameter, in order to afford a large exchange surface. With a diameter of about 200 mm and an effective length l of about 150 mm, the lateral exchange surface $S_{el}$ is about 0.095 m² per electrode and the ratio $S_{el}/l$ is 0.63. During operation, the electrodes are immersed over their entire effective length 150 mm, that is to say over half the height of the bath, the exchange surface per unit of bath volume therefore being 0.190 m² per m³ of bath.

In general, this furnace may be fed with a current density at the electrode of the order of 1 to 3 A/cm².

In a particular operating example, the furnace fed with a current density of 2 to 2.5 A/cm² makes it possible to produce glass with a specific draw of the order of 3 t/d/m², that is to say a total draw of 30 t/d: with a glass having a density of 2.4 t/m³, the volume of glass produced is 12.5 m³ per day. With the volume of the bath being 3 m³, the dwell time of the materials in the bath is approximately 0.25 days with a hearth temperature within the conventional range.

By way of comparison, in relation to a standard furnace with dipping electrodes, comprising a deep shaft containing a glass bath of a height of 1 m, the furnace according to the invention has a construction cost which is reduced by about 40%, corresponding to the reduction in height of the side walls. Moreover, during operation under the same production conditions (same specific draw), the advantageous distribution of the energy in the bath according to the invention makes it possible to reduce energy consumption by about 5%.

FIGS. 4 and 5 show a plate-shaped electrode 19 which can be used in the furnace 1 instead of at least one of the cylindrical electrodes 15.

The actual electrode consists of a rectangular molybdenum plate 20 connected to a steel extension 21 by screwing. The plate 20 is provided with an internal thread 22 made in the thickness of the plate in the middle of the side of largest dimension (length). The extension 22 is provided with a corresponding threaded end 23.

The extension 21 is the means of connection between the electrode and the arm supporting the assembly as a whole: the function of the said extension is to support the electrode and deliver the electrical current to the electrode. During operation, the said extension passes through the layer 13 of raw materials on top of the bath, the lower portion, which has the thread 23 inserted into the plate 20, being located approximately at a level corresponding to half the thickness of the surface layer 13.

In order to prevent the fastening between the electrode and steel extension from melting, and in order to prevent the wear of the molybdenum in the fastening zone in the upper part of the plate 20, furthermore, a cooling system 24 of the "water-jacket" type, incorporated in the extension 21, has been provided.

This system comprises a circuit 25 for the circulation of cooling water within the extension between an inlet orifice 26 and an outlet orifice 27.

The extension 21, provided with the cooling system 24, is equipped with a plate 28 for connection to a supporting element (arm), not shown, which penetrates through the side walls of the furnace.

As an example, a plate electrode 19 functionally equivalent to the cylindrical electrode 15 described above has a length of 300 mm, a height of 150 mm and a thickness of 45 mm.

The diameter of the internal thread 22 should preferably be the largest possible, so as to have the firmest possible fastening of the electrode. This results, moreover, in better cooling of the entire electrode zone supported, since the threaded end 23 of the extension 21, the said threaded end containing the end of the cooling system 24, supplies a higher flow of water.

Under these circumstances, it is preferable for the shoulder 29 on the extension 21 to be such that it projects beyond the thickness of the plate 20. In fact, electrical contact feeding the electrode takes place on this front contact surface. It is therefore advantageous for this contact surface to be as large as possible, in order to avoid excessive current densities on this connecting surface of the electrode.

With the dimensions indicated above, the lateral surface of the plate 20 is 0.103 m$^2$ per electrode, this being very close to the lateral surface $S_{el}$ of the electrode 15.

By contrast, the weight of the plate 20 is only about 21 kg, instead of about 50 kg for the cylindrical bar 15.

For the same current supply capacity, the plate electrode 19 is more than twice as light as the cylindrical electrode 15.

The reduction in weight of the electrode leads to a reduction in the lever arm on the support of the electrode and thus makes it possible to simplify the construction of the furnace.

This electrode 19 was tested under the same operating conditions as those described above as regards the electrode 15, with a current density at the electrode of about 2 A/cm$^2$.

Under these conditions, melting has the same qualities with both types of electrodes. Whilst the cylindrical electrode 15 wears with a loss of 3.1 grams of molybdenum per tonne of glass produced, the electrode 19 wears with a loss of 2.9 grams of molybdenum per tonne of glass produced. Due to the cooling of the threaded end of the extension 21, the wear of the plate takes place from the outer rectangular faces, without detriment to electrical contact.

The thickness of 45 mm of the plate 20 is sufficient to ensure that the electrode has a satisfactorily long life. This could be explained, in particular, by the fact that, the loss of mass being equal, the surface of a plate would decrease less quickly than the surface of a cylinder.

Figure 6:
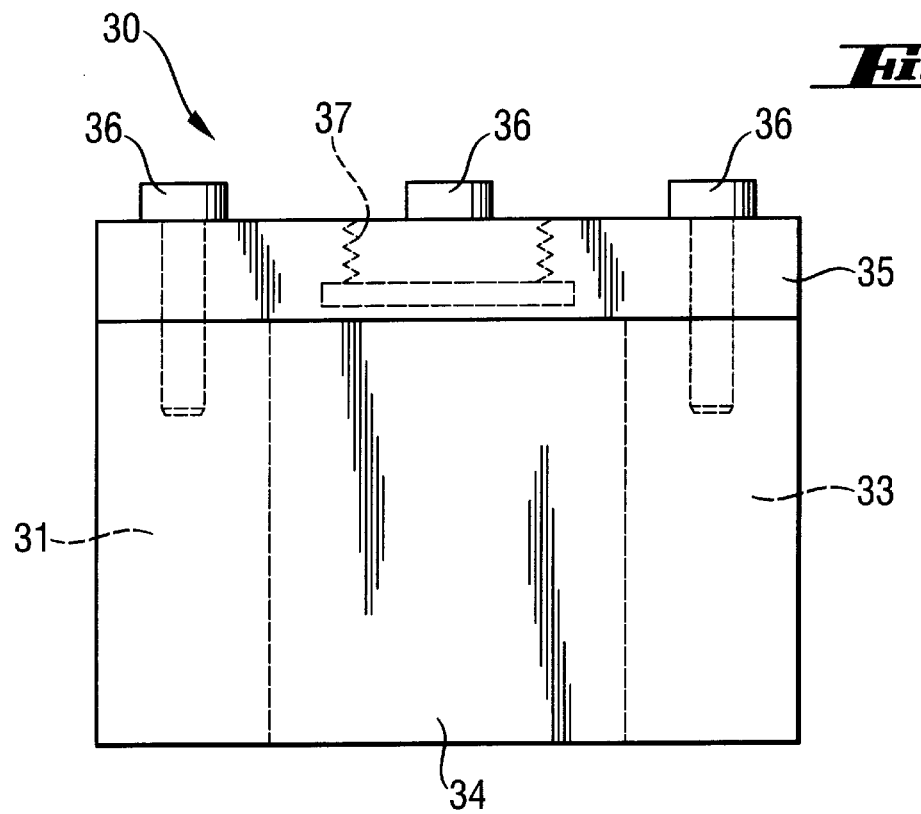
FIG. 6 shows a partially sectional side view of an electrode consisting of an assembly of plates and capable of being used in a furnace according to the invention.
Figure 7:
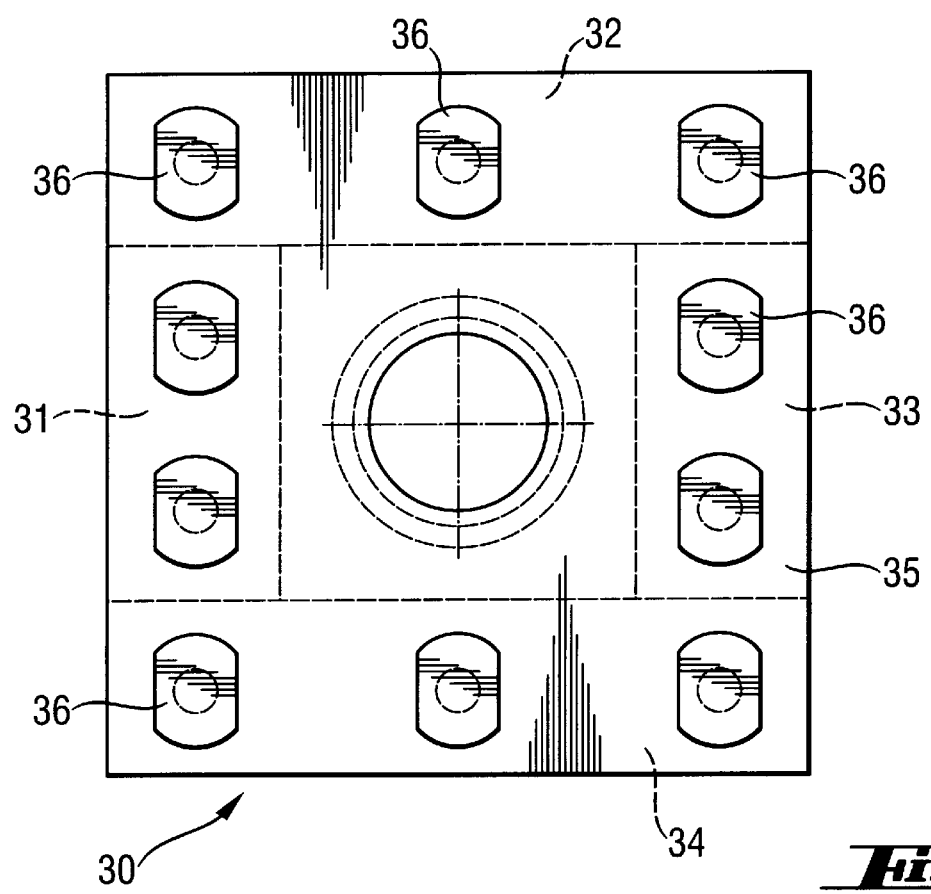
FIG. 7 shows an elevation view of the assembly of plates shown in FIG. 6.

FIGS. 6 and 7 show a hollow electrode 30 having a square cross-section and consisting of an assembly of four molybdenum plates 31, 32, 33, 34 fastened to a molybdenum support plate 35 by means of screws 36, likewise made of molybdenum.

The support plate 35 is provided with an internal thread 37 making it possible to fasten the electrode to an extension, not shown, which may have a structure similar to that of the extension 21 provided with a cooling system.

As compared with the plate electrode 19 of FIGS. 4 and 5, the square electrode 30 makes it possible to diffuse electrical current in four perpendicular directions, instead of two opposite directions.

In a particular example, the dimensions of the plates 31, 32, 33 and 34 are such that each face of the electrode measures 160 mm wide by 150 mm high, thus giving a total lateral exchange surface of 0.096 m$^2$ that is to say of the order of that of the electrode 15.

With a total weight of 32 kg, the electrode 30 is also twice as efficient as the cylindrical electrode 15.

The electrodes 19 and 30 may be provided with means for setting their orientation, in particular by pivoting about a vertical axis or a horizontal axis, in order to adjust the distribution of the current lines in the melted bath.

These means may, in particular, be carried by the extension 21 or else by the carrier element, on which the extension is suspended.

In FIGS. 4 and 5, the electrode 19 comprises such means of orientation about a vertical axis, in the form of the pipe union 40 between the extension 21 and the support 28.

The glass worked in the furnace 1, once it has been conveyed to the fibre-drawing machine 4, is converted into glass wool, with a non-fibre proportion which is as low as with glasses obtained from traditional furnaces.

The step of transporting the melted glass towards the conversion device may advantageously be utilized for homogenizing and refining the glass. However, even if the conditions of conveyance were not the best possible or if the glass worked in the furnace 1 was not sufficiently homogeneous or refined on account of uncontrolled variations in the production parameters, it was observed that the fibre-drawn product nevertheless has satisfactory qualities.

Combining the furnace according to the invention with a conversion device, such as a fibre-drawing machine with internal centrifuging, proves particularly advantageous, probably because the centrifugal force exerted on the melted glass within the fibre-drawing machine gives the glass a higher degree of homogeneity, this ultimate homogenization improving the ability of the glass to be converted into wool.

The furnaces of very small height according to the invention, particularly in which the height h of melted glass may range from 20 to 300 or 400 mm, preferably from 200 to 300 or 400 mm, are therefore used particularly advantageously in this type of installation, the (investment and operating) costs of which they reduce considerably.

The invention, which has just been described in terms of an installation for the manufacture of insulating materials based on glass wool, is in no way limited to this particular embodiment, and other glass products may be manufactured by using the melting device according to the invention, coupled to suitable conversion means.

What is claimed is:

1. Furnace for preparation of glass by electric melting, comprising:
    a bath of melted glass having a top surface, with a layer of vitrifiable material on the top surface; and
    a plurality of melting electrodes immersed into said bath from said top surface to heat the glass via the Joule effect, wherein a height of the bath is less than 800 mm and a ratio of the height to the area of said top surface is less than 0.5 m/m².

2. Furnace according to claim 1, wherein a height of the bath is less than 800 mm and a ratio of the height to the area of said top surface is less than 0.3 m/m².

3. Furnace according to claim 1, wherein a height of the bath is less than 500 mm.

4. Furnace according to claim 1, wherein the electrodes are immersed in the bath over a height which is less than two thirds of the height of the bath.

5. Furnace according to claim 1, wherein the electrodes are shaped such that for each electrode, a ratio of a lateral surface area of the electrode to the length of the electrode is at least 0.45 m²/m.

6. Furnace according to claim 1, wherein at least one of said electrodes comprises a substantially planar conductor element.

7. Furnace according to claim 6, wherein at least one of said electrodes comprises at least one plate.

8. Furnace according to claim 6, wherein at least one of said electrodes comprises at least one rectangular horizontally extending body.

9. Furnace according to claim 6, wherein at least one of said electrodes includes means for pivoting the electrode about an axis.

10. Furnace for preparation of glass by electric melting, comprising:
   a bath of melted glass having a top surface, with a layer of vitrifiable material on the top surface; and
   a plurality of melting electrodes immersed into said bath from said top surface to heat the glass via the Joule effect,
   wherein a height of the bath is less than 800 mm and an immersed surface area of said plurality of melting electrodes per unit of bath volume is greater than 0.075 m²/m³.

11. Furnace according to claim 10, wherein a height of the bath is less than 500 mm.

12. Furnace according to claim 10, wherein the electrodes are immersed in the bath over a height which is less than two thirds of the height of the bath.

13. Furnace according to claim 10, wherein the electrodes are shaped such that for each electrode, a ratio of a lateral surface area of the electrode to the length of the electrode is at least 0.45 m²/m.

14. Furnace according to claim 10, wherein at least one of said electrodes comprises a substantially planar conductor element.

15. Furnace according to claim 14, wherein at least one of said electrodes comprises at least one plate.

16. Furnace according to claim 14, wherein at least one of said electrodes comprises at least one rectangular horizontally extending body.

17. Furnace according to claim 14, wherein at least one of said electrodes includes means for pivoting the electrode about an axis.

18. Method for melting glass, comprising the steps of:
   distributing materials forming the composition to be melted onto a top surface of a bath of the molten glass;
   feeding an electric current through electrodes immersed in the bath to heat the glass via the Joule effect; and
   drawing of the molten glass at a flow rate expressed by a specific draw $T_{spec}$, wherein an average dwell time of the materials in the bath is such that the average dwell time times $T_{spec}$ is less than 0.8 m²/t.

19. Method according to claim 18, wherein the average dwell time of the materials in the bath is not greater than 0.7 days, for a specific draw on the order of 3 tonnes/m²/day.

20. Installation for the manufacture of glass wool, comprising:
   a furnace comprising a bath of melted glass having a top surface, with a layer of vitrifiable material on the top surface; and a plurality of melting electrodes immersed into said bath from said top surface to heat the glass via the Joule effect, wherein a height of the bath is less than 800 mm and a ratio of the height to the area of said top surface is less than 0.5 m/m²;
   a fiber drawing device; and
   means for feeding the fiber drawing device with molten glass from the furnace.

21. Installation according to claim 20, wherein said fiber drawing device has a centrifuging part.

22. Installation for the manufacture of glass wool, comprising:
   a furnace comprising a bath of melted glass having a top surface, with a layer of vitrifiable material on the top surface; and a plurality of melting electrodes immersed into said bath from said top surface to heat the glass via the Joule effect, wherein a height of the bath is less than 800 mm and an immersed surface area of said plurality of melting electrodes per unit of bath volume is greater than 0.075 m²/m³;
   a fiber drawing device; and
   means for feeding the fiber drawing device with molten glass from the furnace.

23. Installation according to claim 22, wherein said fiber drawing device has a centrifuging part.

24. Method for melting glass, comprising the steps of:
   distributing materials forming the composition to be melted onto a top surface of a bath of the molten glass;
   feeding an electric current through electrodes immersed in the bath to heat the glass via the Joule effect; and
   drawing of the molten glass at a flow rate expressed by a specific draw $T_{spec}$, wherein an average dwell time of the materials in the bath is such that the average dwell time times $T_{spec}$ is less than 2 m²/t.

25. Method according to claim 24, wherein the average dwell time of the materials in the bath is such that the average dwell time times $T_{spec}$ is less than 1.2 m²/t.

* * * * *